US011877357B2

(12) United States Patent
Dubost et al.

(10) Patent No.: US 11,877,357 B2
(45) Date of Patent: Jan. 16, 2024

(54) BODY PART ELEMENT COMPRISING A HEATING FILM

(71) Applicant: COMPAGNIE PLASTIC OMNIUM SE, Lyons (FR)

(72) Inventors: Elise Dubost, Sainte-Julie (FR);
Frédéric Stablo, Sainte-Julie (FR);
David Tresse, Sainte-Julie (FR);
Damien Boisson, Sainte-Julie (FR);
Thierry Jacquemet, Sainte-Julie (FR);
Ismael Selmane, Sainte-Julie (FR)

(73) Assignee: COMPAGNIE PLASTIC OMNIUM SE

( * ) Notice: Subject to any disclaimer, the term of this patent is extended or adjusted under 35 U.S.C. 154(b) by 604 days.

(21) Appl. No.: 16/941,795

(22) Filed: Jul. 29, 2020

(65) Prior Publication Data

US 2021/0037610 A1    Feb. 4, 2021

(30) Foreign Application Priority Data

Jul. 29, 2019   (FR) ...................................... 1908631

(51) Int. Cl.
*H05B 1/02*       (2006.01)
*B29C 45/14*      (2006.01)
(Continued)

(52) U.S. Cl.
CPC ..... *H05B 1/0236* (2013.01); *B29C 45/14639* (2013.01); *B29C 45/14819* (2013.01);
(Continued)

(58) Field of Classification Search
CPC ........ B29C 45/14639; B29C 45/14819; B29C 2045/14868; B29C 45/14836;
(Continued)

(56) References Cited

U.S. PATENT DOCUMENTS

| 2017/0367149 A1* | 12/2017 | Takemura | ........... B29C 45/1675 |
| 2018/0269569 A1 | 9/2018 | Nicke et al. | |
| 2022/0001584 A1* | 1/2022 | Huber | ............... B29C 45/14221 |

FOREIGN PATENT DOCUMENTS

| DE | 102013012785 A1 * | 2/2015 | ............. B29C 70/72 |
| DE | 102018007404 A1 | 3/2019 | |
| FR | 3075720 A1 | 6/2019 | |

OTHER PUBLICATIONS

Search Report issued in French Patent Application No. 1908631, dated Jan. 24, 2020, 2 pages.

\* cited by examiner

*Primary Examiner* — S. Behrooz Ghorishi
(74) *Attorney, Agent, or Firm* — Dilworth IP, LLC

(57) ABSTRACT

A method for manufacturing an element for a bodywork part successively including the steps of producing a support element having a first face on which a support sheet is fixed having at least one connection member, arranging a heating track on the support element, the heating track being arranged on the first face of the support element, connecting the heating track to the connection member, and arranging the support element in a molding chamber of a mold defining the shape of the element for a bodywork part, the first face of the support element facing the inside of the molding chamber, and injecting a plastic material into the molding chamber in order to cover the heating track.

9 Claims, 2 Drawing Sheets

(51) Int. Cl.
 *B32B 15/08* (2006.01)
 *B32B 27/40* (2006.01)
 *B29K 75/00* (2006.01)
 *B29L 31/30* (2006.01)

(52) U.S. Cl.
 CPC .............. *B32B 15/08* (2013.01); *B32B 27/40* (2013.01); *B29C 2045/14868* (2013.01); *B29K 2075/00* (2013.01); *B29K 2995/0005* (2013.01); *B29L 2031/3044* (2013.01); *B32B 2307/412* (2013.01); *B32B 2605/00* (2013.01)

(58) Field of Classification Search
 CPC .... B29C 2045/14844; B29C 45/14811; H05B 1/0236; H05B 3/286; H05B 2214/02; H05B 2203/013; B32B 15/08; B32B 27/40; B32B 2307/412; B32B 2605/00; B29K 2075/00; B29K 2995/0005; B29K 2995/0026; B29K 2995/0029; B29L 2031/3044; H01Q 1/3233; H01Q 1/3275; H01Q 1/3283; H01Q 1/425; H01Q 1/02; H01Q 1/422; H01Q 1/3208
 See application file for complete search history.

Fig. 1
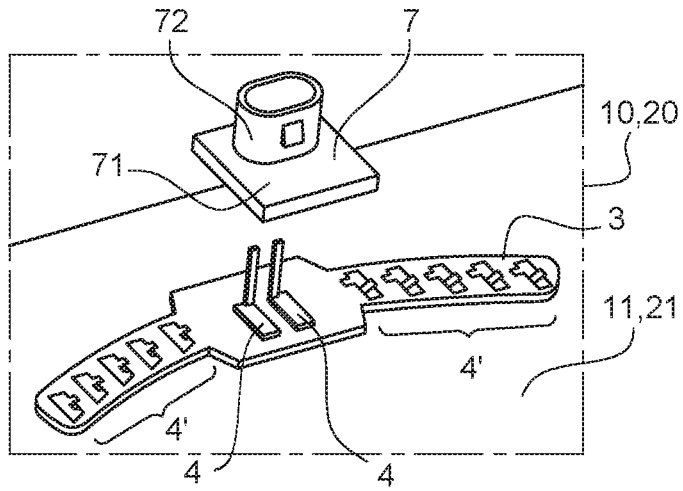
Fig. 2
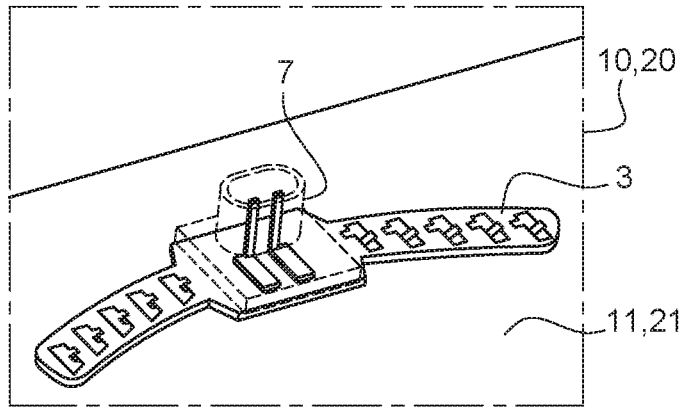
Fig. 3
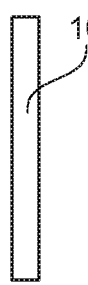
Fig.3a
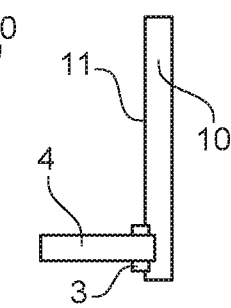
Fig.3b
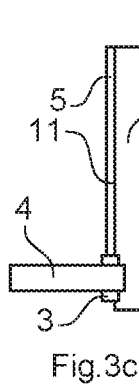
Fig.3c
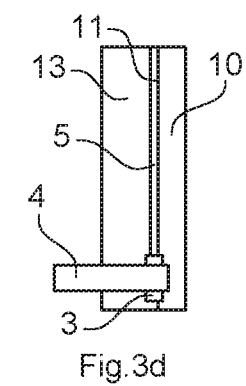
Fig.3d
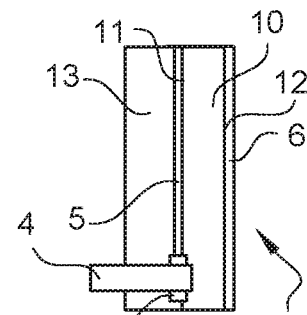
Fig.3e

Fig. 4
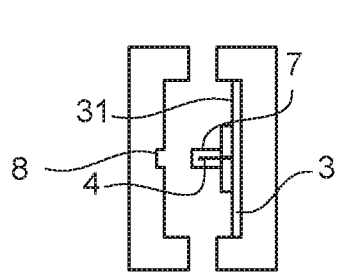
Fig.4a
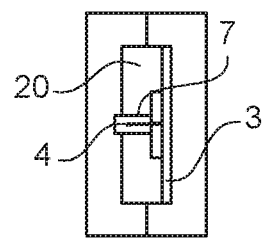
Fig.4b
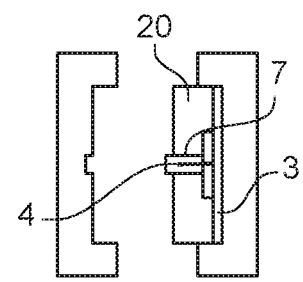
Fig.4c
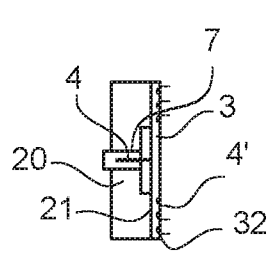
Fig.4d
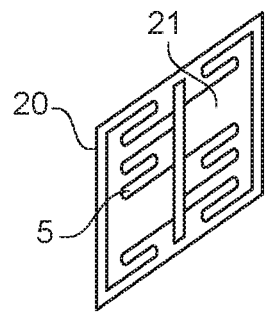
Fig.4e
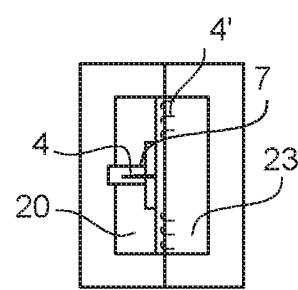
Fig.4f
Fig. 5
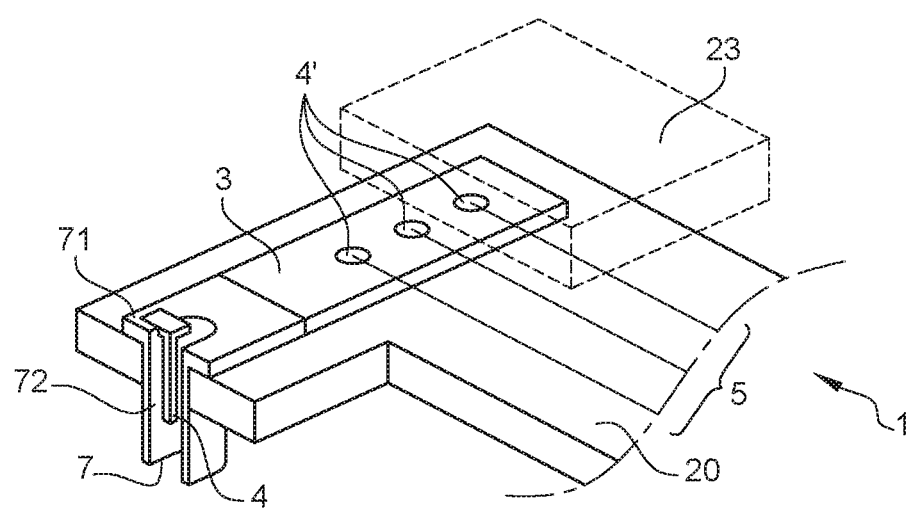

BODY PART ELEMENT COMPRISING A HEATING FILM

FIELD OF THE INVENTION

The invention relates to the field of motor vehicles. And more particularly the field of the manufacture of a plastic element, intended to be mounted on a bodywork part.

BACKGROUND OF THE INVENTION

Many modern vehicles are fitted with plastic bodywork components which can be fitted, for example, to a rear hatch, a door blank, front and rear bumpers, a roof, etc.

In particular, since the introduction of driving assistance systems, there has been a need to place sensors of various kinds on certain plastic bodywork parts, in order to measure external physical parameters representative of the external environment of the motor vehicle. All of the values of these parameters form information available in real time on the environment of the vehicle.

Bodywork elements are then used, attached to the bodywork part, for example having a radome function, that is to say an element transparent to electromagnetic waves protecting and hiding sensors. In a conventional manner, the term "transparent" is understood to mean the capacity of a material passed through by an incident wave flow to transmit a fraction greater than 90% of the wave flow passing through it. Hereinafter, the term "transparent" will be used to refer to this definition.

By way of example, bumpers are now frequently equipped with proximity radars that make it possible to assist the driver during the phases of parking the motor vehicle at low speed.

The normal operation of some sensors, such as the one cited in the example above, can be disrupted by the presence of a layer of ice, snow or frost in the event of temperatures below 10 degrees Celsius. This layer of frost disrupts the normal passage of electromagnetic waves, which is a source of error for the evaluation of external physical parameters.

In order to avoid the deposit of frost, which not only makes the assistance system unusable, but which can also generate false alarms, it is essential to provide a de-icing system on the element for a bodywork part, for example on the area of the body part which serves as a radome.

Such a de-icing system is conventionally formed by a heating track, made up of conductive wires capable of transforming electrical energy into thermal energy, and is associated with two connection plates arranged at each end of the heating track in order to supply it with an electric current. This system is positioned on an element for a bodywork part located near a sensor. The thermal energy thus released makes it possible to defrost the part locally in the event that a layer of frost has formed.

Known, for example, from document US2018/0269569 is a heating radome comprising a flexible printed circuit board (or PCB) forming a film that is stamped and molded on the back with a thermoplastic material. The printed circuit board comprises a metallic structure that is produced by means of linear strips. The radome further comprises a connector for connecting the printed circuit board to a power supply. The radome as described in this document requires a film large enough to be able to cover the entire area to be heated, which is equivalent to the surface of the radome. Thus, the two layers of plastic are separated from one another by the film, which has a large bulk, making the radome not very robust and not very waterproof. In addition, since the heating elements are supported by the film, the latter is present over the entire area to be heated. The transparent areas of the radome are reduced due to the presence of the film. Thus, the esthetic quality of the radome is degraded.

SUMMARY OF THE INVENTION

The object of the invention is in particular to provide an element intended to be mounted on a bodywork part, for example a radome, which is more robust and aesthetic.

To that end, the invention relates to a method of manufacturing an element for a bodywork part successively comprising the following steps:

Step A: a support element is produced having a first face on which a support sheet is fixed comprising at least one connection member.

Step B: at least one heating track is placed on the support element, the heating track being arranged on the first face of the support element, Step C: the heating track is connected to the connection device, Step D: the support element is placed in a molding chamber of a mold defining the shape of the element for a bodywork part, the first face of the support element facing the inside of the molding chamber, and a plastic material is injected into the molding chamber to cover the heating track.

The method as proposed by the present invention makes it possible to arrange one or more heating tracks in the places which require a heat contribution, which increases the defrosting efficiency. In addition, substantially the entire support element is separated from the molded layer only by the heating tracks, which allows a reduced space requirement between the layers and an increased strength of the final part. The esthetic quality of the bodywork part element is also improved thanks to the absence of a support sheet on almost all of this element. Indeed, the support sheet comprising the connection member can easily be moved into an area that is hardly visible from the outside of the vehicle.

According to the invention, the support sheet is a flexible sheet, for example a flexible printed circuit board, which can be subjected to mechanical torsion and which makes it possible to save space compared to the use of rigid circuits or manual wired cabling. The connection member may be formed from an electrically conductive plate or a metal pin and the heating track may be formed from an electrically conductive wire.

According to other optional features of the manufacturing method taken alone or in combination:

the support element is a plastic film and step A comprises the following steps:
  making a plastic film,
  fixing a support sheet comprising at least one connection member on a first face of the film.

Fixing the support sheet to the film makes it possible to guarantee the holding of the support sheet during the overmolding step of the film. This fixing can be done by gluing, welding or even the use of adhesive tape. The film is produced by extrusion or calendering, but it is also possible to consider using a commercially available film.

the manufacturing method comprises the following step:
  a coating is deposited on a second face of the support element, opposite the first face. The coating improves the resistance of the support element to UV rays or scratching. The coating can be a varnish or a coating resulting from a hardcoat treatment.

the support element is a molded part and step A comprises the following steps:

arranging a support sheet comprising at least one connection member in a molding chamber of a mold defining the shape of the support element, a first face of the support sheet facing the inside of the molding chamber, and injecting a plastic material into the molding chamber in order to obtain a molded part covering the first face of the support sheet, arranging at least one connection element on a second face of the support sheet, opposite the first face.

the manufacturing method comprises the following step before step D: arranging a protection means for the connection member on the support sheet so as to at least partially protect the connection member from the plastic material during step D. The protection means has a space at least partially containing the connection member so that the latter is isolated from the plastic material injected during molding while retaining access to it for connection to a power supply.

the heating track is connected to the connection device by welding. The welding can be of a different type, for example TC bonding (or thermocompression bonding) or even electric welding.

the support sheet comprises a plurality of connection elements electrically connected to one another by connection means integrated into the support sheet and steps B and C consist of placing a corresponding number of heating tracks on the support element and in connecting each heating track to a connection element. It is then possible to arrange the heating tracks independently, which facilitates the distribution of the heating zones based on needs and improves the esthetic appearance of the radome.

fixing on the support element by gluing or by local melting of the support element. the heating track comprises a material chosen among copper, tungsten, or an alloy of copper and tungsten.

the support sheet is made from a sheet of silicone, polyolefin (polyethylene or polypropylene), thermoplastic elastomer (TPE), polyester, or polyamide. The support sheet can also be made from epoxy. The material that is overmolded on the support sheet is chosen so as to be chemically compatible with the film in order to ensure good bonding and to guarantee a minimal interface defect.

The invention also relates to an element for a bodywork part comprising a first transparent plastic layer, a second transparent plastic layer, a heating track arranged between the transparent plastic layers and connected to a connection member, the heating track being in direct contact with the first and second layers.

BRIEF DESCRIPTION OF THE FIGURES

The invention will be better understood upon reading the description which follows, given solely by way of example and with reference to the appended drawings in which:

FIG. 1 is a perspective view of an element for a bodywork part according to the invention during manufacture;

FIG. 2 is a perspective view of the element for a bodywork part of FIG. 1 equipped with a protection means;

FIG. 3 is a set of diagrams (FIGS. 3a-3e) illustrating different steps of the method for manufacturing the element for bodywork according to a first embodiment;

FIG. 4 is a set of diagrams (FIGS. 4a-4f) illustrating different steps of the method for manufacturing the element for bodywork according to a second embodiment;

FIG. 5 is a perspective view of the element for bodywork partially cut along a plane orthogonal to the support sheet obtained according to the second embodiment.

DETAILED DESCRIPTION OF THE INVENTION

FIGS. 1 and 2 show an element for a bodywork part designated by general reference 1 that is being manufactured according to the method as proposed by the present invention. The manufacturing method comprises a first step in which a support element 10 or 20 is produced having a first face 11, 21 on which a support sheet 3 is fixed comprising at least one connection member 4. The connection member 4 is formed from an electrically conductive plate. The connection member 4 will allow at least one heating track 5 to be connected to a power source. As will be described below, the support sheet 3 can comprise one or more connection elements 4' connected to each other and to the connection member 4; each connection element 4' can be connected to a heating track 5. The various possibilities for producing electrical circuits connecting the various aforementioned elements, which are well known to those skilled in the art, will not be subject to a detailed description in the present application.

Two embodiments are illustrated respectively in FIGS. 3 and 4 and will be described in detail below. In both embodiments, a heating track 5 is placed on the support element 10, 20, the heating track 5 being arranged on the first face 11 or 21 of the support element 10 or 20, the heating track 5 being able to be formed by a wire conductor of electricity. Then, the heating track 5 is connected to the connection member 4 (for example by soft soldering) and the support element 10 or 20 is placed in a molding chamber of a mold defining the shape of the element for a bodywork part, the first face 11 or 21 of the support element 10, 20 facing the inside of the molding chamber, and a plastic material is injected into the molding chamber in order to cover the heating track 5.

During this injection, it is possible to place a protection means 7 for the connection member 4 around the latter to protect it from the injected plastic material by isolating it so as to subsequently guarantee its access in order to connect it to a power supply means.

Advantageously, the protection means 7 is the connector base making it possible to connect the connection member 4 to a power supply means by accommodating a connector (not shown). Thus, the formed assembly already comprises a means for fixing a connector.

In the case where the protection means 7 comprises an opening making it possible to connect the connection member 4 to a connector (for example if the protection member 7 is a connector base comprising a wall (or shaft) 72 surrounding the connection member), the mold in which the plastic material is injected comprises a housing 8 (numbered in FIG. 4a) in which the wall 72 is housed so as to close the opening and thus prevent the entry of plastic material inside the protection means 7 and then covering the connection member 4 by means of an adjustment between the wall 72 and the housing 8.

As will be described later, the number of moldings may vary depending on the embodiment. Therefore, it is possible to reproduce this closing configuration of the opening in the housing 8 for each molding in order to protect the connection member 4.

Now, we will describe the first embodiment, which is visible in FIGS. 3a-3e. According to this embodiment, the support element 10 is a plastic film as illustrated in FIG. 3a.

This film can be produced by extrusion or calendering before fixing a support sheet 3 comprising at least one connection member 4 on a first face 11 of the film as illustrated in FIG. 3b. It is also conceivable to use a commercially available film. The film forms a first transparent layer.

As can be seen in FIG. 3c, a heating track 5 is placed on the film, the heating track 5 being arranged on the first face 11 of the support element 10. Then, the heating track 5 is connected to the connection member 4, for example by soldering. The heating track 5 is distributed homogeneously over the entire surface of the film and is fixed thereto by gluing or by local melting of the film.

A molding step is then carried out in which the support element 10 is arranged in a molding chamber of a mold defining the shape of the element for a bodywork part, the first face 11 of the support element 10 facing the inside of the molding chamber, and a plastic material is injected into the molding chamber in order to cover the heating track 5. A second transparent layer 13 is thus obtained as illustrated in FIG. 3d. The molding chamber of the element for a bodywork part is configured so that after molding, the connection member 4 is accessible by a power supply means. Thus, the thickness of the second transparent layer 13 is less than that of the connection member 4. It is also during this step that protection of the connection member 4 by a protection means 7 as described above can be envisaged by placing said protection means 7 prior to this step.

In order to improve the resistance of the element to UV rays and to protect it from scratching, it is possible to deposit a coating 6 on a second face 12 of the film that is opposite the first face 11 as shown in FIG. 3e. This step can also be considered in the second embodiment, which is illustrated in FIGS. 4 and 5.

According to the second embodiment of the present invention, the support element 20 is a molded part forming a first transparent layer that is obtained by the following steps: a support sheet 3 comprising at least one connection member 4 is placed in a molding chamber of a mold defining the shape of the molded part as shown in FIG. 4a. A first face 31 of the support sheet 3 is placed facing the inside of the molding chamber. When the mold is closed, a plastic material, for example a thermoplastic material, is injected into the molding chamber as shown in FIG. 4b and the molded part covering the first face 31 of the support sheet 3 is obtained as shown in FIG. 4c. The molding chamber of the molded part 20 is configured such that the thickness of the molded part 20 is less than that of the connection member 4 so that the latter is accessible by a power supply means. As can be seen in FIGS. 4a to 4c, it is possible to place the protection means 7 around the protection member 4 during this first molding in order to isolate it from the injected material as explained above.

Subsequently, as visible in FIG. 4d, there are several connection elements 4' on a second face 32 of the support sheet 3 that is opposite the first face 31, the connection elements 4' being electrically connected to each other by connection means that are integrated into the support sheet 3. All of the connection elements 4' are also connected to the connection member 4, which is located on the first face 31.

After the overmolding of the first transparent layer (or support element 20) and as visible in FIG. 4e, heating tracks 5 are placed on the first layer and each connected to a connection element 4' on the second face 32 of the support sheet 3 by welding. These may for example be several wires as described above forming a heating zone (this configuration with several connection elements 4' and several heating tracks 5 can also be considered for the first embodiment of the invention). The heating tracks 5 are distributed homogeneously over the entire surface of the first transparent layer and are fixed thereto by gluing or by local melting of the first layer.

Finally, the assembly comprising the first layer, the support sheet 3 and the heating tracks 5 is placed in a molding chamber defining the shape of the element for a bodywork part, the first face 21 of the support element 20 facing the inside of the molding chamber. Another plastic material, for example thermoplastic polyurethane (TPU), is injected into the molding chamber in order to cover the heating tracks 5 as illustrated in FIG. 4f. Here again, the protection means 7 can protect the connection member 4 (for example, the opening of the protection means 7 can again be placed in the notch 8).

According to the first or second embodiment, an element 1 is obtained for a bodywork part comprising a first transparent plastic layer (corresponding to the support element 10 or 20), a second layer 13, 23 made from transparent plastic, at least one heating track 5 arranged between the layers of transparent plastic and connected to a connection member 4, the heating track 5 being in direct contact with the first and second layers.

Such an element 1 obtained using the manufacturing method according to the second embodiment is visible in FIG. 5, which illustrates another aspect of the invention relating to a protection means 7 for the connection member. The protection means 7 as also illustrated in FIGS. 1 and 2 comprises a base 71 intended to bear against the support sheet 3 and a wall 72 extending from the base 71 and defining a space intended to contain the connection member 4 at least partially so that the latter is isolated from the plastic material injected during the molding while retaining access to it for connection to a power supply.

The invention is not limited to the embodiments described here, and other embodiments will become clearly apparent to a person skilled in the art. It is in particular possible to arrange several connection members in the first embodiment and to connect them together electrically. It is also possible to provide a ring or an opaque technical zone making it possible to hide the support sheet when the element is assembled on the vehicle.

LIST OF REFERENCES

1: element
10, 20: support element (first layer)
13, 23: second layer
11, 21: first face of the support element
12: second face of the support element
3: support sheet
31: first face of the support sheet
32: second face of the support sheet
4: connection member
4': connection elements
5: heating track
7: protection means
71: base of the protection means
72: wall of the protection means
8: housing

The invention claimed is:

1. A method of manufacturing an element for a bodywork part successively comprising the following steps:
Step A: producing a support element having a first face on which a support sheet is fixed comprising at least one connection member, Step B: arranging at least one heating track directly on the support element, the heating track being arranged directly on the first face of the support element, Step C: connecting the heating track to the connection member, and Step D: arranging the support element in a molding chamber of a mold defining a shape of the element for the bodywork part, the first face of the support element facing an inside of the molding chamber, and injecting a plastic material into the molding chamber in order to cover the heating track, wherein the method further comprises the following step before the step D:

arranging a connector base comprising a wall or shaft surrounding the connection member on the support sheet so as to at least partially protect the connection member from the plastic material during the step D.

2. The manufacturing method according to claim 1, wherein the support element is a plastic film and the step A comprises the following steps:

making the plastic film, fixing the support sheet comprising the at least one connection member on a first face of the film.

3. The manufacturing method according to claim 1, comprising the following step:

depositing a coating on a second face of the support element, opposite the first face.

4. The manufacturing method according to claim 1, wherein the support element is a molded part and the step A comprises the following steps:

arranging the support sheet comprising the at least one connection member in the molding chamber of the mold defining the shape of the support element, the first face of the support sheet facing the inside of the molding chamber, and injecting the plastic material into the molding chamber in order to obtain a molded part covering the first face of the support sheet, arranging at least one connection element on a second face of the support sheet, opposite the first face.

5. The manufacturing method according to claim 1, wherein the heating track is connected to the connection member by welding.

6. The manufacturing method according to claim 1, wherein the support sheet comprises a plurality of connection elements that are electrically connected to each other by connection means integrated in the support sheet and the steps B and C consist of arranging a corresponding number of heating tracks on the support element and of connecting each heating track to a connection element.

7. The manufacturing method according to claim 1, wherein the heating track is fixed on the support element by gluing or by local melting of the support element.

8. The manufacturing method according to claim 1, wherein the heating track comprises a material selected from copper, tungsten, or an alloy of copper and tungsten.

9. The manufacturing method according to claim 1, wherein the support sheet is made from a sheet of silicone, polyolefin, polyethylene, polypropylene, thermoplastic elastomer (TPE), polyester, or polyamide.

* * * * *